(12) United States Patent
Nader et al.

(10) Patent No.: US 11,218,894 B2
(45) Date of Patent: Jan. 4, 2022

(54) CONFIGURATION OF A CONNECTION

(71) Applicant: Telefonaktiebolaget LM Ericsson (publ), Stockholm (SE)

(72) Inventors: Ali Nader, Malmö (SE); Dimitrios Kotsaris, Lund (SE); Béla Rathonyi, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/645,532

(22) PCT Filed: Feb. 8, 2018

(86) PCT No.: PCT/EP2018/053173
§ 371 (c)(1),
(2) Date: Mar. 9, 2020

(87) PCT Pub. No.: WO2019/052691
PCT Pub. Date: Mar. 21, 2019

(65) Prior Publication Data
US 2020/0280866 A1    Sep. 3, 2020

Related U.S. Application Data

(60) Provisional application No. 62/557,890, filed on Sep. 13, 2017.

(51) Int. Cl.
*H04L 29/08* (2006.01)
*H04W 4/00* (2018.01)
(Continued)

(52) U.S. Cl.
CPC .............. *H04W 24/08* (2013.01); *H04W 8/24* (2013.01); *H04W 64/003* (2013.01); *H04W 68/005* (2013.01)

(58) Field of Classification Search
None
See application file for complete search history.

(56) References Cited

U.S. PATENT DOCUMENTS

2015/0373721 A1    12/2015  Zhang et al.

FOREIGN PATENT DOCUMENTS

| EP | 2629556 A1 | 8/2013 |
| WO | 2015027437 A1 | 3/2015 |

(Continued)

OTHER PUBLICATIONS

Unknown, Author, "Clarification on Rel-14 NPDCCH monitoring", 3GPP TSG RAN WG1 Meeting #89; R1-1707799; Hangzhou, China, May 15-19, 2017, pp. 1-3.

(Continued)

*Primary Examiner* — Gary Lafontant
(74) *Attorney, Agent, or Firm* — Murphy, Bilak & Homiller, PLLC

(57) ABSTRACT

A method for use in a communication network (200), said method comprising during connection of a user equipment (100) to the Network (200): determining if there is a connection profile available for the UE (100), and if so fetching UE profile and configuring the connection with the UE (100) according to the UE profile; monitoring the traffic characteristics during the connection; and updating and storing the UE profile if needed.

12 Claims, 4 Drawing Sheets

(51) Int. Cl.
*H04W 4/06* (2009.01)
*H04W 24/08* (2009.01)
*H04W 8/24* (2009.01)
*H04W 64/00* (2009.01)
*H04W 68/00* (2009.01)

(56) References Cited

FOREIGN PATENT DOCUMENTS

| WO | 2016057198 A1 | 4/2016 | |
|---|---|---|---|
| WO | 2016130175 A1 | 8/2016 | |
| WO | 2017105522 A1 | 6/2017 | |
| WO | WO-2017105522 A1 * | 6/2017 | ............. H04L 67/34 |

OTHER PUBLICATIONS

Unknown, Author, "Consideration on paging issues for NB-IoT", 3GPP TSG-RAN WG2 meeting #91 bis; R2-154454; Malmo, Sweden, Oct. 5-9, 2015, pp. 1-3.

* cited by examiner 110  120B
  100

110  120B
       210

CONFIGURATION OF A CONNECTION

TECHNICAL FIELD

This application relates to a base station, a telecommunications device, a method and a computer-readable storage medium, a circuit arrangement for improved configuration of a connection.

BACKGROUND

The Internet of Things (IoT) is the inter-networking of physical devices, vehicles (also referred to as "connected devices" and "smart devices"), buildings, and other items embedded with electronics, software, sensors, actuators, and network connectivity which enable these objects to collect and exchange data. The IoT allows objects to be sensed or controlled remotely across existing network infrastructure, creating opportunities for more direct integration of the physical world into computer-based systems, and resulting in improved efficiency, accuracy and economic benefit in addition to reduced human intervention.

NB-IoT (Narrowband Internet of Things) is a narrowband (180 kHz bandwidth) system being developed for cellular internet of things by the 3GPP group. The system is based on existing LTE (Long Term Evolution) systems and addresses optimised network architecture and improved indoor coverage for massive number of devices with following characteristics:

low throughput devices (e.g. 2 kbps)
low delay sensitivity (~10 seconds)
ultra-low device cost (below 5 dollars)
low device power consumption (battery life of 10 years)

It is envisioned that each cell (~1 km2) in this system will serve thousands (~50 thousand) devices such as sensors, meters, actuators, etc. It is imperative that this system can provide good coverage for its devices (UEs) which often are located deep indoors e.g. underground in basements, or even built into walls of a building and with no possibility for battery charging.

In 3GPP, work has been ongoing to support coverage enhancements of up to 164 dB coupling loss. This is achieved by user- and control-plane data repetition. On the receiving side, data from each repetition is soft-combined before decoding. The number of repetitions will be configured per UE (and further varies per physical channel). It is important to note that repetition is done per packet spanning over several 1 millisecond (ms) transmission time intervals (TTIs); e.g. to reach 164 dB, 24 repetitions of a 776 bit packet spanning over 9 ms leads to 216 ms transmission/reception time in total.

In order to make it possible to deploy NB-IoT using only one re-farmed GSM (Global System for Mobile Communications) carrier and support lower manufacturing costs for NB-IoT UEs, the bandwidth has been reduced to one physical resource block (PRB) of size 180 kHz divided into several subcarriers. For the UL, either 15 kHz or 3.75 kHz subcarrier spacing is applicable depending on the system configuration. Additionally, in the UL (uplink) also single-tone transmissions (i.e. using one subcarrier only) are supported.

For FDD (i.e. the transmitter and receiver operate at different carrier frequencies) only half-duplex mode needs to be supported in the UE. The lower complexity of the devices (e.g. only one transmission/receiver chain) means that some repetition might be needed also in normal coverage. Further, to alleviate UE complexity, the working assumption is to have cross-subframe scheduling. That is, a transmission is first scheduled on a Physical DL Control Channel (NPDCCH) and then the first transmission of the actual data on the Physical DL Shared Channel (NPDSCH) is carried out after the final transmission of the NPDCCH. Similarly, for uplink (UL) data transmission, information about resources scheduled by the NW and needed by the UE for UL transmission is first conveyed on the NPDCCH and then the first transmission of the actual data by the UE on the Physical UL Shared Channel (NPUSCH) is carried out after the final transmission of the NPDCCH. In other words, for both cases above, there is no simultaneous reception of control channel and reception/transmission of data channel from the UE's perspective.

NB-IoT user data transfer method from higher layers comes in two flavors:
Data transfer via Control Plane CIoT EPS optimization (aka DoNAS solution)
Data transfer via User Plane CIoT EPS optimization (aka U-Plane solution)

In the DoNAS solution, since DoNAS does not permit RRC re-configuration messages, the eNB has only one chance to configure the UE with RRM-related configuration in MSG4 for connected mode operations.

In the U-Plane solution the RRC re-configuration procedure is available but it requires system resources and increased UE power consumption compared to getting the configuration correct at MSG4.

The inventors of the inventions to be discussed herein, have, after insightful and inventive reasoning, envisioned and realized that there will be problems in that:

Connected mode parameter configurations for UEs in the same coverage situation is today the same even if the traffic characteristics/patterns during the connection differ a lot. The reason for this is that the only information provided to the eNB before deciding these parameters is a rough buffer status report in the connection request message (Msg3) from the UE. Having these static "one fit all" configurations result in non-optimal UE power consumption and system resource utilization.

Although the eNB controls the lifetime of the connection towards the UE, it is difficult for the eNB to know for how long the connection shall be maintained before releasing the UE to Idle mode. Keeping the UE in connected mode is quite costly in terms of UE power consumption. Releasing the UE prematurely in case there are more data to be exchanged would require another connection establishment procedure possibly preceding with a paging procedure shortly after the connection was released. This is costly not only in terms of UE power consumption but also in terms of system resource utilisation.

In connected mode, a NB-IoT UE needs to go through a RA (random access) procedure to provide its buffer status report to request an UL grant for data transmission. That procedure is costly both in terms of UE power consumption and system resource consumption (both UL and DL resources as well as eNB processing capacity). Thus, the frequency of RA procedures should be kept low for UEs in connected mode.

When paging the UE, it is difficult for the eNB to know what repetition rate shall be applied to the paging message at different times of day.

In view of the problems and shortcomings indicated above, there is a need for an improved manner of monitoring a control channel that reduces the power consumption and also the consumption of other resources.

SUMMARY

The inventors of the present invention have realized, after inventive and insightful reasoning that there are envisioned problems as discussed above, and especially that in NB-IoT (Narrowband Internet of Things) (for example using DoNAS (Data over NAS)), the base station (aka eNB) has one chance to configure RRM (Radio Resource Management) parameters. Such configuration resides in the RRC Configuration Setup message (aka MSG4) sent in downlink (DL) to the UE (User Equipment) from the eNB. As the inventors have realised, a generic configuration from eNB suffers from one-size-fits-all problem. An eNB operating an NB-IoT system (DoNAS being one example, but not the only as will be discussed below) might configure the system such that the resource utilization in the cell and the UE power consumption is non-optimal. The inventors therefore propose a solution to this as will be discussed below, and that can be expressed as to introduce a mechanism that analyses the traffic and coverage patterns from various NB-IoT devices and categorize them into different profiles. Once the UEs are categorized, their profiles together with configuration that was deemed successful for that specific UE/profile are stored for future connections. At the future connection, the eNB configures the UE and the system based on the stored/retrieved profile in an efficient manner.

It is therefore an object of the teachings of this application to overcome or at least mitigate one or more of the problems and shortcomings listed above and below by providing a method for use in a communication network, said method comprising during connection of a user equipment to the Network: determining if there is a connection profile available for the UE, and if so fetching UE profile and configuring the connection with the UE according to the UE profile; monitoring the traffic characteristics during the connection; and updating and storing the UE profile if needed.

In one embodiment the method further comprises that when there is no UE profile available, determining if there is another user equipment that have a known profile, and if so, configuring the connection with the UE according to the UE profile for another UE (either fully or subset of the profile); monitoring the traffic characteristics during the connection; and updating the other UE profile and storing it as the UE profile for the UE.

In one embodiment the method further comprises that when the UE profile is not fetched within a time limit, determining if there is another user equipment that have a known profile, and if so, configuring the connection with the UE according to the UE profile for the another UE; monitoring the traffic characteristics during the connection; and updating the other UE profile and storing it as the UE profile for the UE.

In one embodiment the method further comprises selecting another UE profile based on the UE and the another UE being of a similar type of UE, belong to a same or similar owner, and/or be operating in the same geographical location.

In one embodiment the method further comprises selecting the other UE profile(s) may be selected to be suitable for a specific time of day, a specific location, intended use, type of UE, amount of UEs in the network and/or the current UE coverage.

In one embodiment the method further comprises determining that there are UE profile(s) available, and if so configure the connection based on a default UE profile; monitoring the traffic characteristics during the connection; and updating the default UE profile and storing it as the UE profile for the UE.

In one embodiment the method further comprises selecting the default UE profile to be suitable for a specific time of day, a specific location, intended use, type of UE, amount of UEs in the network and/or the current UE coverage.

In one embodiment the storing of the UE profile is done at regular or irregular intervals, continuously as a change is detected/needed, and/or it may be done as the UE is released.

In one embodiment the UE profile or at least an indicator of the UE profile is appended to at least one container in message(s) to be transmitted to the network.

In one embodiment the container is assistance data for paging.

In one embodiment the container is a UE Radio Access Capability container.

It is also an object of the teachings of this application to overcome or at least mitigate one or more of the problems and shortcomings listed above and below by providing a base station arranged to perform the method herein, below and above.

It is also an object of the teachings of this application to overcome or at least mitigate one or more of the problems and shortcomings listed above and below by providing a user equipment arranged to perform the method herein, below and above.

It is also an object of the teachings of this application to overcome or at least mitigate one or more of the problems and shortcomings listed above and below by providing a circuit for use in a communication network during connection of a user equipment to the Network, the circuit arrangement comprising: a determination circuit for determining if there is a connection profile available for the UE, and if so fetching UE profile through a fetching circuit and a configuration circuit for configuring the connection with the UE according to the UE profile; a monitoring circuit for monitoring the traffic characteristics during the connection; and a storing circuit for updating and storing the UE profile if needed.

It is also an object of the teachings of this application to overcome or at least mitigate one or more of the problems and shortcomings listed above and below by providing a computer readable storage medium encoded with instructions that, when executed on a processor, perform the method according to herein.

By allowing the UE profile to be updated, the one-for-all-solution is avoided and the network may be arranged to operate at a higher efficiency.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings, in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
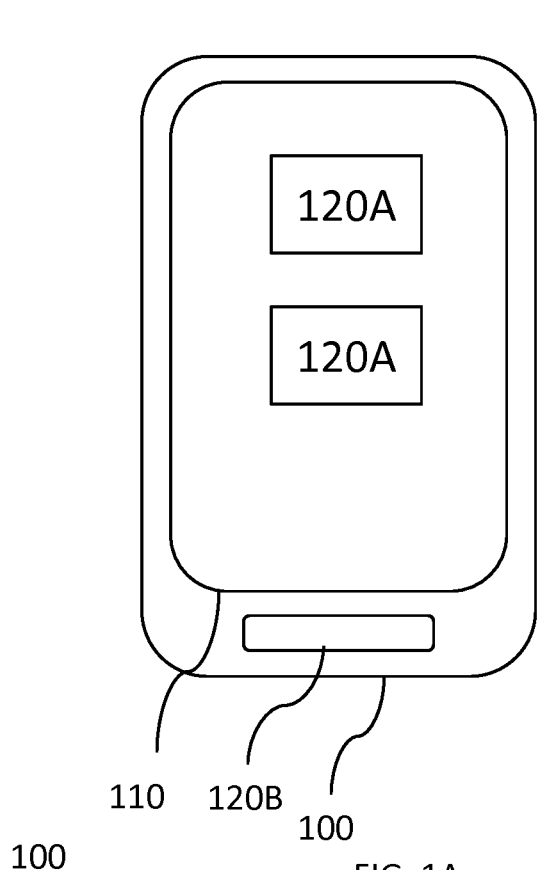
FIG. 1A shows a schematic overview of a UE according to one embodiment of the teachings of this application.

In the internet of things, many different types of devices and apparatii that are traditionally not arranged for communication, have been arranged for communication so that they may be interconnected and for sharing data and control. Examples can be a refrigerator, a lamp, a car, a TeleVision set, to mention only a very few examples of User Equipments. To provide examples of all sorts of user equipment or user terminals would render this application unreadable, and one type of UE will serve as a general example of a UE. FIG. 1A shows a schematic overview of such a User Equipment (UE) 100 according to one embodiment of the present invention. The UE is exemplified as being a smartphone 100.

The UE 100 may comprise a user interface, which may be in the form of a presentation device 110 being able to output, such as a display or an arrangement of light emitting diodes. The user interface may also comprise a data reception device, being configured to receive data. One example of a presentation device combined with a data reception device is a touch display 110.

The touch display 110 a user provides input by touching the display, possibly on a virtual key 120A. Other manners of inputting data is through physical keys 120B. In the example of FIG. 1A, the UE 100 has two virtual keys 120A and one physical key 120B, however, as would be understood, any number, shape and arrangement of keys depends on the design of the UE, and also the current execution context of the UE.

Figure 1C:
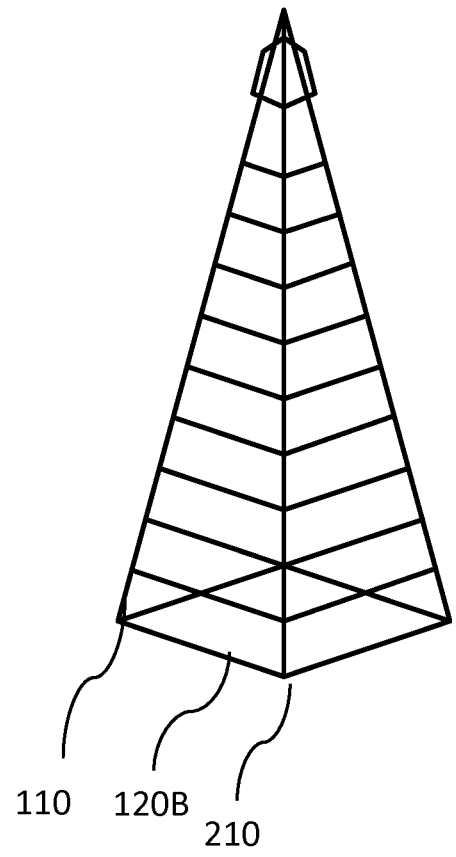
FIG. 1C shows a schematic overview of an eNB according to one embodiment of the teachings of this application.
Figure 1B:
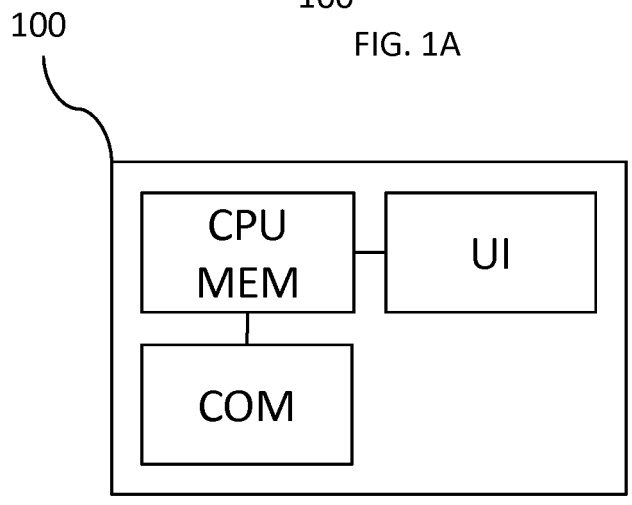
FIG. 1B shows a schematic overview of the components of a UE according to one embodiment of the teachings of this application.

FIG. 1B shows a schematic view of the components of a UE 100. A controller CPU is configured to control the overall and also specific functions of the UE 100 such as by executing computer program instructions loaded into or stored on a memory connected or being part of the controller. The controller may comprise one or more processors or other logic programmable circuits for combined or individual execution of a task or application. However, for the purpose of this application they will be seen as being the one and same controller CPU. The controller CPU is connected to a memory MEM for storing computer instructions and also data to be processed by the computer instructions when executed by the controller CPU. The memory may comprise one or several memory circuits, possibly arranged in a hierarchy. One or more of such memory circuits may be comprised in the controller CPU. For the purpose of this application the memory circuits will be regarded as one memory MEM.

The controller CPU may also be connected to a user interface UI for receiving input from a user and for presenting data or other information to the user. As discussed above, a display may be comprised in the user interface UI.

The controller is also connected to a communications interface COM, such as a Radio frequency interface. The RF interface may be configured to operate according to a long range standard, such as a cellular network standard, for example a 4G (LTE; Long Term Evolution) or 5G standard. The RF interface may alternatively or additionally be configured to operate according to a short range standard, such as a Bluetooth®, IEEE802.11b (WiFi™), IEEEE802.16, ZigBee™ or NFC™ (Near Field Communication) standard, for example a 5G standard.

The communications interface COM enables a first UE 100 to communicate with a second UE or with a base station eNB to mention a few examples. It may also enable the UE 100 to communicate with other devices, such as sensors.

FIG. 1C shows an exemplary and schematic view of a base station, such as an eNB 210. The eNB may be configured to operate according to an LTE standard. The eNB may also or alternatively be configured to operate according to a 5G (New Radio) standard.

Figure 1D:
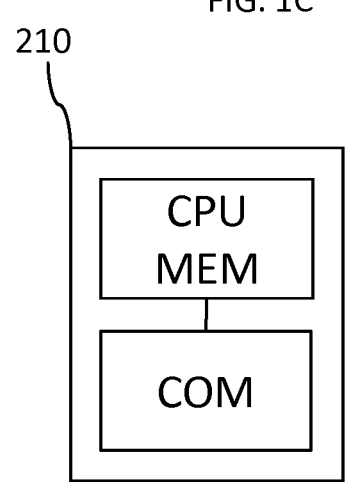
FIG. 1D shows a schematic overview of the components of an eNB according to one embodiment of the teachings of this application.

FIG. 1D shows a schematic view of the components of an eNB 210. A controller CPU is configured to control the overall and also specific functions of the eNB 210 such as by executing computer program instructions loaded into or stored on a memory connected or being part of the controller. The controller may comprise one or more processors or other logic programmable circuits for combined or individual execution of a task or application. However, for the purpose of this application they will be seen as being the one and same controller CPU. The controller CPU is connected to a memory MEM for storing computer instructions and also data to be processed by the computer instructions when executed by the controller CPU. The memory may comprise one or several memory circuits, possibly arranged in a hierarchy. One or more of such memory circuits may be comprised in the controller CPU. For the purpose of this application the memory circuits will be regarded as one memory MEM.

The controller is also connected to a communications interface COM, such as a Radio frequency interface. The RF interface may be configured to operate according to a long range standard, such as a cellular network standard, for example a 4G (LTE; Long Term Evolution) or 5G standard. The RF interface may alternatively also be configured to operate according to a short range standard, such as a Bluetooth®, IEEE802.11b (WiFi™), IEEE802.16, ZigBee™ or NFC™ (Near Field Communication) standard, for example a 5G standard.

The communications interface COM enables an eNB 210 to communicate with a UE, with a second base station eNB and/or the rest of a network (200, 220) such as a system server (for example an MME) to mention a few examples. It may also enable the eNB 210 to communicate with other devices, such as sensors.

Figure 2:
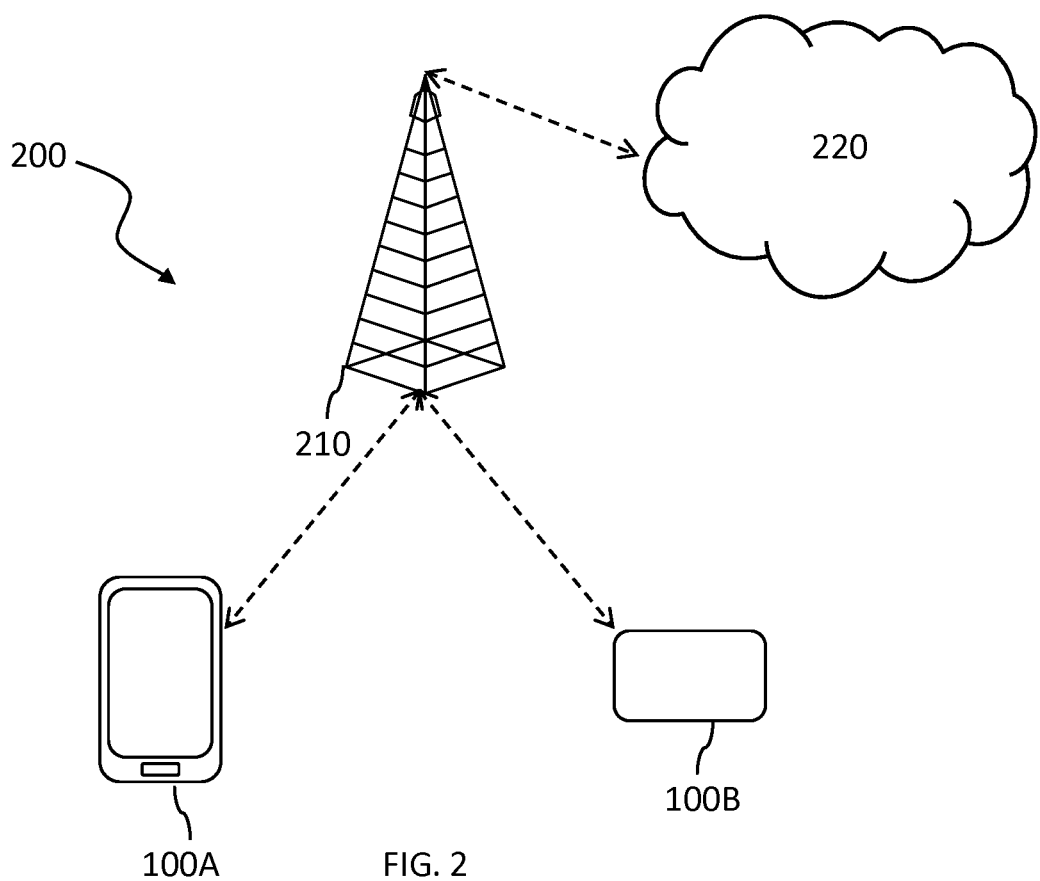
FIG. 2 shows a schematic view of an example UE system according to one embodiment of the teachings of this application.

FIG. 2 shows a communication system or network (NW) 200 arranged to operate according to the 4G or the 5G standard, in which a UE 100 is communicating (as indicated by the dashed arrows) with a base station eNB 210. The eNB is connected to the rest of the network as indicated by a cloud 220. As a skilled person would realise, the manner of connecting to the rest network may be done in a different manner and depends on the actual Radio technology used and is therefore only indicated as a cloud and will not be discussed in further detail herein, but is usually done through connecting with one or more network sensors. In the example of FIG. 2, there are two UEs, a first UE 100A and a second UE 100B. The first and second UEs may communicate with one another, possibly through the eNB 210 (or even through Device-2-Device (D2D) communication—not shown). In the example of FIG. 2, the first UE 100A may be a smartphone and the second UE 100B may be a home appliance, such as a refrigerator or a thermometer. The first 100A may thus monitor (receive data from) and control (send data to) the second UE 100B. It should be noted that as a UE 100 connects to a eNB, it also connects to the NW 200 and becomes part of the network.

Figure 3:
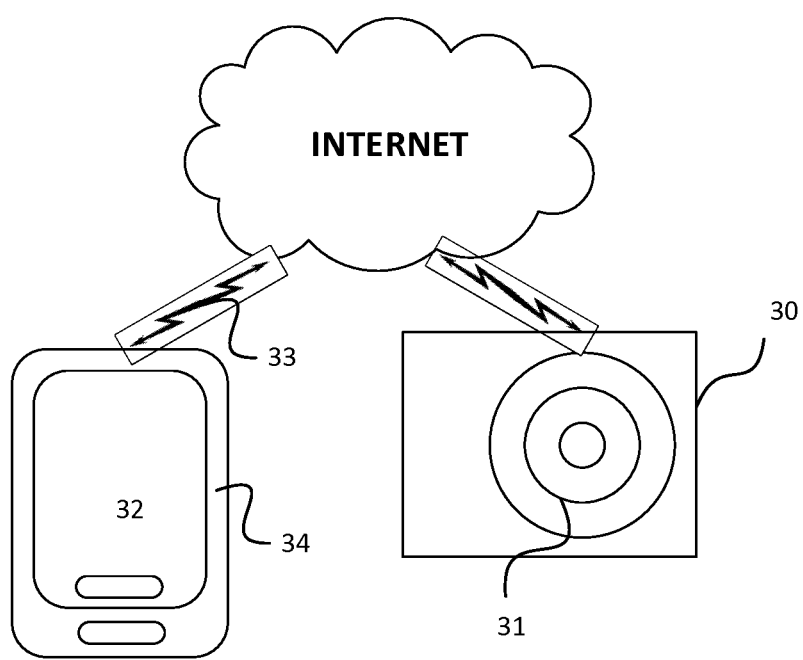
FIG. 3 shows a schematic view of a computer-readable medium according to the teachings herein.

FIG. 3 shows a schematic view of a computer-readable medium as described in the above. The computer-readable medium 30 is in this embodiment a data disc 30. In one embodiment the data disc 30 is a magnetic data storage disc. The data disc 30 is configured to carry instructions 31 that when loaded into a controller, such as a processor, executes a method or procedure according to the embodiments disclosed above. The data disc 30 is arranged to be connected to or within and read by a reading device 32, for loading the instructions into the controller. One such example of a reading device 32 in combination with one (or several) data disc(s) 30 is a hard drive. It should be noted that the computer-readable medium can also be other mediums such as compact discs, digital video discs, flash memories or other memory technologies commonly used.

The instructions 31 may also be downloaded to a computer data reading device 34, such as an eNB 210 or a UE 100 or other device capable of reading computer coded data on a computer-readable medium, by comprising the instructions 31 in a computer-readable signal 33 which is transmitted via a wireless (or wired) interface (for example via the Internet) to the computer data reading device 34 for loading the instructions 31 into a controller. In such an embodiment the computer-readable signal 33 is one type of a transient computer-readable medium 30.

The instructions may be stored in a memory (not shown explicitly in FIG. 3, but referenced MEM in FIG. 1B) of a UE, such as a smartphone, 34. The UE exemplified as a smartphone in FIG. 3 may possibly be a smartphone as in FIGS. 1A and 1B. The instructions comprising the teachings according to the present invention may thus be downloaded or otherwise loaded in to a UE 100 in order to cause the UE 100 to operate according to the teachings of the present invention.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 4:
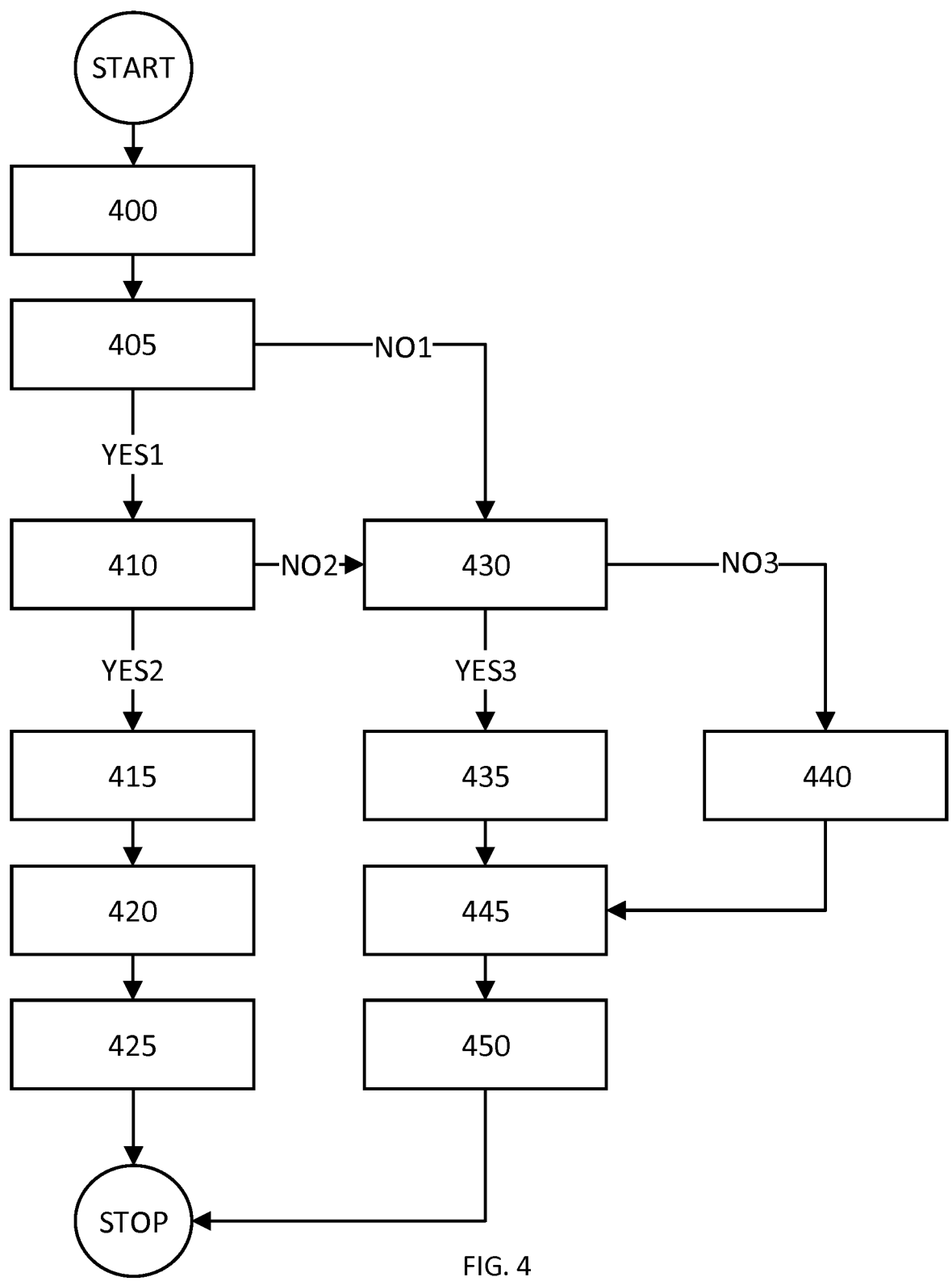
FIG. 4 shows a flowchart for a general method of controlling a telecommunications device according to the teachings herein.

The invention will now be described based on the flowchart in FIG. 4 showing a flowchart for a general method according to herein. The teachings herein serve to introduce a mechanism that analyses the traffic and coverage patterns from various NB-IoT devices and categorize them into different profiles. Once the UEs are categorized, their profiles together with configuration that was deemed successful for that specific UE/profile are stored for future connections. At the future connection, the eNB configures the UE 100 and the system based on the stored/retrieved profile in an efficient manner. The configuration will thus be able to be adapted based on the actual traffic behavior for a UE 100.

As the UE 100 connects 400 to the Network 200, the network 200 (such as in the eNB 210) determines 405 if there is a connection profile available for the UE, and if so (YES1) the UE profile is fetched 410, and if the UE profile is fetched within a time limit (YES2), the UE 100 and/or the network 200 are configured 415 according to the UE profile.

The configuration of the network may also be done based on UE profiles for other UEs (100B) in the network.

As discussed below, the traffic characteristics (such as the traffic pattern) are monitored 420 during the connection (presumably by the eNB 210, but may also be done in part or fully by the UE or other network component 220) and the UE profile is updated 425 (if needed). The update may be done at regular or irregular intervals, it may be done continuously as a change is detected/needed, and/or it may be done as the UE is released from the eNB.

If there is no UE profile available (NO1) or if the UE profile is not fetched within a time limit (NO2), it is determined 430 if there are other UEs (such as the second UE 100B) in the network, that have a known profile. The other UEs may be chosen to be of a similar type of UE (smartphone matched to smartphone, household appliance matched to household appliance), belong to a same or similar owner, be operating in the same geographical location, or on another commonality. If there are other UE profiles available (YES3), the connection may be made 435 based on one or a combination of more than one other UE profile. The other UE profile(s) may be selected to be suitable for a specific time of day. The other UE profile(s) may also or alternatively be selected to be suitable for a specific location, intended use, type of UE, amount of UEs in the network and/or the current UE coverage.

If there are no other UE profiles available (NO3), the connection may be made 440 based on a default UE profile. The default UE profile may be selected to be suitable for a specific time of day. The default UE profile may also or alternatively be selected to be suitable for a specific location, intended use, type of UE, amount of UEs in the network and/or the current UE coverage.

The system then proceeds by monitoring the traffic characteristics (such as the traffic pattern) 445 during the connection (presumably by the eNB 210, but may also be done in part or fully by the UE or other network component 220) and the UE profile is stored 450 (if needed). The storing may be done at regular or irregular intervals, it may be done continuously as a change is detected/needed, and/or it may be done as the UE is released from the eNB.

This is an overview of a general method according to the teachings herein and may be adapted and/or supplemented in many ways as will be discussed below.

As discussed above, during operation the NW analyzes the traffic behavior for a NB-IoT UE 100 and stores the traffic behavior for future connections. The analysis may be done by the eNB 210, by the UE 100 or by another network component, represented by the network NE 200, or in any combination of them, one or more than one entity performing a partial analysis. Such analysis for a specific UE 100 includes:

At what times of day/year, geographical position, and in which coverage level does the UE 100 establish a specific type of connection (i.e. the establishment cause)

For a specific time of day/year, establishments cause, geographical position, and coverage level Traffic characteristics/pattern for each direction containing:

packet sizes number of packets packet arrival pattern, e.g.

always request-response pattern i.e. 1 UL followed by 1 DL mainly UL or DL potentially after a (short) initial request-response pattern and/or ending with a (short) request-response pattern only UL or only DL etc packet inter-arrival times excessive re-connection attempts done by the UE 100 while in RRC Connected mode due to poor coverage. Furthermore, upon connection failures, on which alternative carriers (anchor/non-anchor NB-IoT carriers aka PRBs (Physical Resource Block)) is the connection more successful. Based on such historical data, upon connection establishment in similar problematic condition, the UE 100 is immediately reconfigured to the alternative carriers.

UE DL performance as this may differ between different UE vendors, e.g. experienced UE sensitivity (or some similar) to be able to set less/more aggressive Rmax and MCS/repetition levels Based on the above analysis the traffic behavior of the UE 100 is categorized into a specific profile stored (either internal or external to the 3GPP NW) for configuration of RRM resources in the NW 200 during upcoming connections (either RRC Connection Request for DoNAS/U-Plane or RRC Resume Request for U-plane). The granularity of such profile is dependent on the amount of UEs, available memory, processing power and possible delays on various interface within and/or external to the NW. For example, if the resources allow, the profile can be very specific for that UE 100 including exact details (e.g. in the form of a set of parameters) of the analysis (e.g. time-stamps when UE requests UL grants etc.). Alternatively, based on the analysis, the UE 100 can be categorized into a coarser profile e.g. Profile N (suitable for a metering device): number of UL/DL packets, y bytes exchanged during the connection, etc. The key to such a profile database is any type of UE/connection identity (such as IMEI, IMSI, GUTI, TMSI, S-TMSI, C-RNTI, resumeID, truncatedResumeID) possibly combined with any combination of time-of-day, establishment cause, geographical position, and current coverage level.

In one aspect of the present invention, the profiles are stored/fetched in/from databases in the eNB.

In another aspect of the present invention, the profiles are stored/fetched in/from databases external to the 3GPP NW node.

In yet another aspect of the invention, the profiles are stored in a 3GPP node external to eNBs for example in the packet core NW 200 (most suitably in the MME but not excluding other nodes such as the HSS etc). In this aspect, the eNB 210 may exchange fetch/store information in any of the following ways (including combinations thereof):

Via a future standardized, or proprietary interface, or a proprietary parameter within existing 3GPP S1 interface (between eNB 210 and MME) wherein the profile is an explicit entry stored and fetched when needed (e.g. stored/uploaded to MME upon Context Release and fetched by the eNB 210 within Connection Establishment Indication/DL NAS Transport).

Via already exiting 3GPP standardized messages on the S1 interface in which opaque containers are uploaded per UE 100 to the MME and bounced back to the eNB 210 in various procedures upon connection establishment towards that specific UE. Example of such containers provided by the eNB 210 to the MME and bounced back are ASN.1 encoded OCTET STRINGS that are intended for carrying:

Assistance data for paging (provided by the eNB 210 to the MME during context release/suspend procedure; bounced back to the eNB 210 during for example a paging procedure)

UE Radio Access Capability container (in current specifications provided by the eNB 210 to the MME in the UE Capability Info indication message; bounced back to the eNB 210 during DL NAS Transport, Connection Establishment Ind, and Initial Context Setup messages).

The eNB 210 of the present invention, instead of or in addition to using the containers as intended in 3GPP, appends internal profile data (or index/reference to a/an locally/externally stored profile) in the containers and uploads them to the MME. Currently, there are bits available in the containers included in the messages mentioned above so that such profile data can be appended. As the inventors have realized, this provides for a smart storing of data that could otherwise potentially not be stored without having to amend or violate the corresponding communication standard, or requiring additional messages to be sent, increasing the bandwidth and power required for a connection.

SPID (Subscriber Profile Id) for IRAT cell reselection and handover mobility. As NB-IoT lacks handover functionality and IRAT cell reselection, the 8 bits inside SPID can be used for conveying traffic profile information from the MME to the eNB 210 and between different eNBs via an MME.

In yet another aspect of the invention, the profiles can be stored within the eNB 210 and exchanged on the X2 interface between various eNBs in a similar fashion as mentioned above (between eNB← →MME).

Alternatively, or in combination to the above, the UE 100 itself can act as the storage point for the profile. Such information can then be conveyed from the UE 100 to the NW 200 upon connection establishment either explicitly via a standardized interface (not existing to this date), or implicitly in the UE 100 identity assigned by the NW. For example, the M-TMSI (MME Mobile Subscriber Identity) part of the NW-assigned identity that uniquely identifies a UE 100 within an MME is a 32-bit identifier and is conveyed from the UE 100 to the NW 200 when the UE 100 establishes a connection. Some of these bits (e.g. the lower or upper x bits) could act as code points to the UE's profile.

In all aspects of the above, the eNB 210 may combine local storage with external data storage (be it from other eNBs, MMEs, 3GPP external databases, etc.). For example, for certain UEs that historically has proven to suffer from connection failures and reconnections, or alternatively for UEs that during certain circumstances (time-of-day, position, etc.) have proven to behave "chatty", the eNB 210 may have a local database for faster acquisition of the profile data.

The profile information stored above is intended to be used in connection establishments for a specific UE. Note that the profile per UE 100 is tracked and updated on a regular basis to detect changes in the traffic characteristics/pattern/behavior and/or UE performance (e.g. due to a firmware upgrade) of the UE, possibly in a filtered manner so that potential deviations from UE's normal behavior don't change the profile too aggressively. E.g. information of firmware upgrade frequency of a UE could be stored in the profile to avoid changing the general profile every time this occur. If such historical profile information exists for a specific UE 100 and could be fetched from the database within a reasonable amount of time (see figure below), it could in the context of the present invention be used for controlling for example the following parameters in the system and for the connection configuration (as sent in Msg4):

- USS (user-specific search space) configuration (parameters npdcch-StartSF-USS aka G, and npdcch-Num-Repetitions aka Rmax) for a certain UE.
- Rmax would mainly be set to what historically has proven successful (successfully acknowledged data without too many retransmissions) for this UE 100 with current circumstances e.g. coverage level, geographical location (not limited to satellite positioning systems but e.g. based on timing advance)
- G could be set sparse (e.g. 64) if the traffic profile shows that the inter-arrival packet bursts are sparse during the connection and dense (e.g. 1,5) if vice versa. By doing this the UE 100 does not need to listen to the NPDCCH so often and thereby saves battery power.
- Connected mode DRX configuration parameters (same reasoning as for G above)
- Provision of grant by the scheduler. Rather than letting the UE 100 ask for UL grants via random access procedures, grants would be provided according to the profile information (e.g. packet inter-arrival times) and thereby UE power and system resources would be saved.
- Time during which UE 100 is kept in RRC connected state. Any RRC connection inactivity supervision timer in the eNB 210 would be tuned per UE 100 such that the UE 100 is released to idle mode as soon as the eNB 210 has detected that the traffic (e.g. number of packets) stored in the profile has been transferred.
- Tuning of SR (Scheduling Request) and BSR (Buffer Status Report)-related timers. For example, the logicalChannelSR-ProhibitTimer could be set in relation to the connection inactivity supervision timer. In case, there is no prior profile available for the specific UE, this timer could be set shorter than the supervision timer so that the UE 100 can provide a BSR before the inactivity timer times out. On the contrary, in case there exist prior knowledge about traffic model, this timer could be set long as the eNB 210 would automatically know when to grant UL access based on the stored profile.
- Non-anchor PRBs configuration; in case UEs have historically shown to use excessive amount of resources of the system in UL and/or DL at a certain time or in a specific position due to lengthy communication (e.g. either UE 100 is known to be in poor coverage or e.g. a SW upgrade procedure is identified), non-anchor carrier(s) can be used up in proper direction (UL/DL) and the UEs are reconfigured to those carriers upon establishment.
- Redirection to other anchor cells; in case a UE 100 at a certain position (based on e.g. TA) known to be problematic for that specific UE 100 tries to establish a connection, the UE 100 is released and redirected to other carriers (PRBs) known to be more successful for the UE.
- System configuration (not specifically for the UE 100 that entered the system but rather for the whole cell):
- Random Access resources for other UEs in the system. If several UEs are active in the system and according to their profile they are identified with profiles that will consume system resources for long time ahead, the RA resources (including common search space and contention resolution windows) are configured more sparsely. Furthermore, less number of subcarriers can then be configured for NPRACH in favor of more UL subcarriers for NPUSCH communication.
- Number of UL subcarriers and single tone/multi tone assignment: If too many UL heavy UEs are detected from the profiles, the number of UL subcarriers can be re-dimensioned (see previous bullet) and UEs could be assigned to operate in fewer uplink carriers (down to single tone) so that multiple UEs can be served in parallel.
- Default (for UEs with no prior profile) and profile-specific inactivity/connection supervision timers. If the amount of UEs exceed a certain threshold (possibly the amount is counted in a weighted manner in case profile exist for subset of currently active UEs), the connected mode inactivity supervision timers are extended.
- Gap Configuration and System information scheduling; in case too many UEs with downlink-heavy activity are in the system, the system information scheduling could be changed to sparse and gaps could be configured so that more UEs could be served in downlink.

In all aspects of the present invention, the success of the configurations used for a certain profile are tracked and updated together with the profile in case not proven successful enough (in a filtered manner as mentioned above). For example, if a certain parameter, say supervision inactivity timer prove to be too short and the UE 100 tries to establish a connection soon after it was released to idle, the configuration is updated so that the timer is longer in upcoming connections. Generally described, a configuration is seen successful the less control signaling (e.g. request for grants from the UE) it involves and the shorter time UE 100 spends in active communication for transferring the amounts of bits needed to complete its communication and the time the UE 100 monitors NPDCCH candidates without being scheduled.

Figure 5:
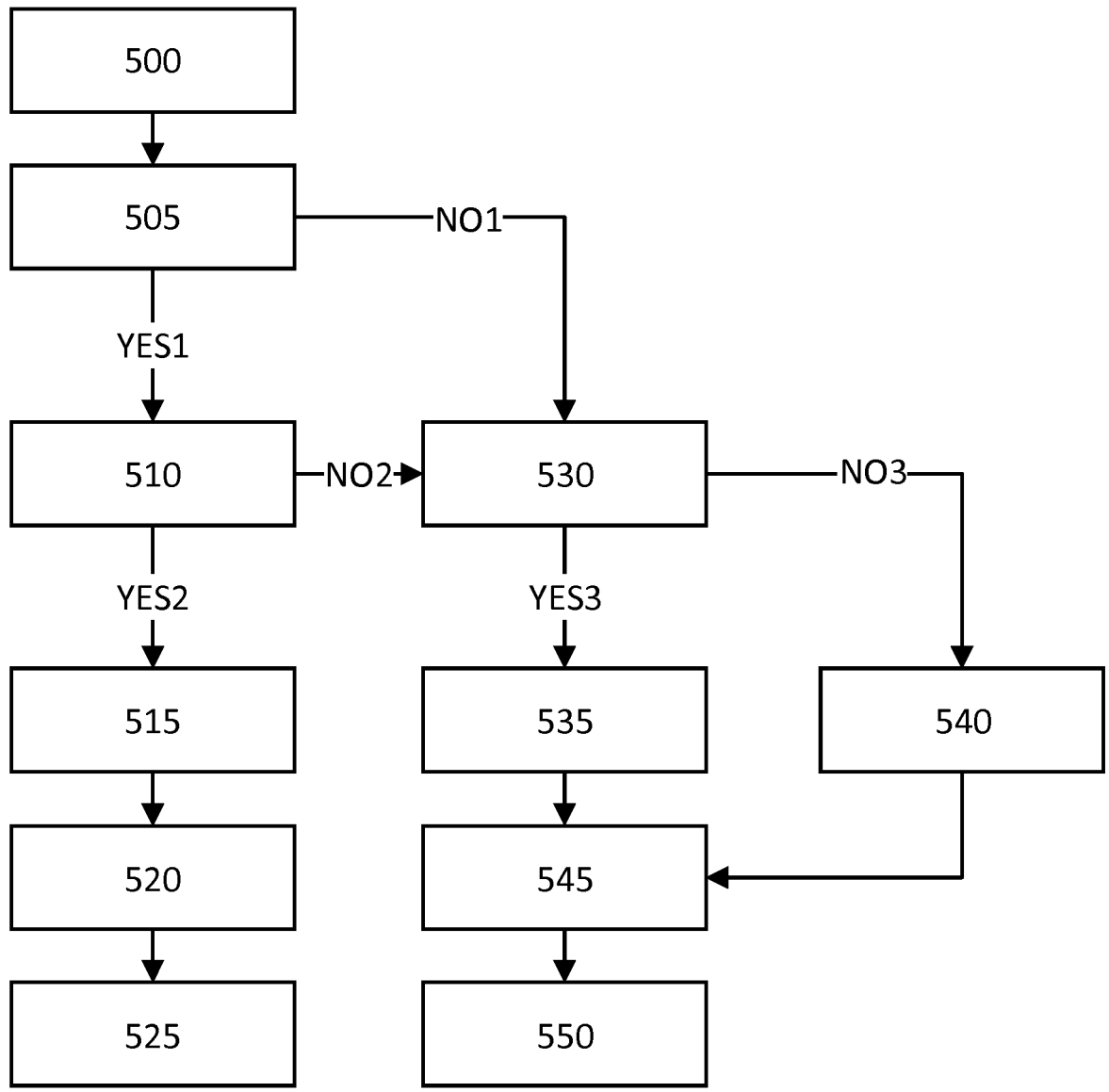
FIG. 5 shows a schematic view of a circuit arrangement for handling a transmission according to one embodiment of the teachings of this application.

The invention will now be described based on the circuit overview of FIG. 5 showing a general overview of circuits or software (virtual m) modules that are arranged to perform the invention or cause the invention to be performed when loaded into a controller (or other processor) and executed.

As the UE 100 connects through a connection circuit 500 to the Network 200, the network 200 (such as in the eNB 210) determines through a determination circuit 505 if there is a connection profile available for the UE, and if so (YES1) the UE profile is fetched through a fetching circuit 510, and if the UE profile is fetched within a time limit (YES2), the UE 100 and/or the network 200 are configured through a configuration circuit 515 according to the UE profile.

The configuration of the network may also be done based on UE profiles for other UEs (100B) in the network.

As discussed below, the traffic characteristics (such as the traffic pattern) are monitored through a monitoring circuit 520 during the connection (presumably by the eNB 210, but may also be done in part or fully by the UE or other network component 220) and the UE profile is updated through an updating circuit 525 (if needed). The update may be done at regular or irregular intervals, it may be done continuously as a change is detected/needed, and/or it may be done as the UE is released from the eNB.

If there is no UE profile available (NO1) or if the UE profile is not fetched within a time limit (NO2), it is determined through a determination circuit 530 if there are other UEs (such as the second UE 100B) in the network, that have a known profile. The other UEs may be chosen to be of a similar type of UE (smartphone matched to smartphone, household appliance matched to household appliance), belong to a same or similar owner, be operating in the same geographical location, or on another commonality. If there are other UE profiles available (YES3), the connection may be made through a connection circuit 535 based on one or a combination of more than one other UE profile. The other UE profile(s) may be selected to be suitable for a specific time of day. The other UE profile(s) may also or alternatively be selected to be suitable for a specific location, intended use, type of UE, amount of UEs in the network and/or the current UE coverage.

If there are no other UE profiles available (NO3), the connection may be made through a connection circuit 540 based on a default UE profile. The default UE profile may be selected to be suitable for a specific time of day. The default UE profile may also or alternatively be selected to be suitable for a specific location, intended use, type of UE, amount of UEs in the network and/or the current UE coverage.

The system then proceeds by monitoring the traffic characteristics (such as the traffic pattern) through a monitoring circuit 545 during the connection (presumably by the eNB 210, but may also be done in part or fully by the UE or other network component 220) and the UE profile is stored through a storing circuit 550 (if needed). The storing may be done at regular or irregular intervals, it may be done continuously as a change is detected/needed, and/or it may be done as the UE is released from the eNB.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a communication network, said method comprising during connection of a user equipment (UE) to the communication network:
   determining whether there is a connection profile available for the UE, and, responsive to determining that there is a connection profile available for the UE, fetching the UE connection profile and configuring the connection with the UE according to the UE connection profile;
   monitoring traffic characteristics of the UE during the connection; and
   updating the UE connection profile based upon the traffic characteristics and storing the updated UE connection profile, when needed.

2. The method of claim 1, further comprising that when there is no UE connection profile available, determining whether there is another UE that has a known profile, and, responsive to determining that there is another UE that has a known connection profile:
   configuring the connection with the UE according to the UE connection profile for the another UE;
   monitoring the traffic characteristics during the connection; and
   updating the other UE connection profile and storing the other UE connection profile as the UE connection profile for the UE.

3. The method according to claim 2, further comprising selecting the another UE based on at least one of the UE and the other UE being of a similar type of UE, belonging to a same or similar owner, or operating in the same geographical location.

4. The method according to claim 2, further comprising selecting the other UE connection profile to be suitable for at least one of a specific time of day, a specific location, an intended use, a type of UE, an amount of UEs in the network or a current UE coverage.

5. The method of claim 1, further comprising that when the UE connection profile is not fetched within a time limit, determining whether there is another UE that has a known connection profile, and responsive to determining that there is another UE that has a known connection profile,
   configuring the connection with the UE according to the UE connection profile for the another UE;
   monitoring the traffic characteristics during the connection; and
   updating the other UE connection profile and storing the other UE connection profile as the UE connection profile for the UE.

6. The method according to claim 1, further comprising determining that there is at least one UE connection profile available, and, responsive thereto:
   configuring the connection based on a default UE connection profile;
   monitoring the traffic characteristics during the connection; and
   updating the default UE connection profile and storing the default UE connection profile as the UE connection profile for the UE.

7. The method according to claim 6, further comprising selecting the default UE connection profile to be suitable for at least one of a specific time of day, a specific location, an intended use, a type of UE, an amount of UEs in the network or a current UE coverage.

8. The method according to claim 1, wherein the storing of the UE connection profile is performed at one or more of regular or irregular intervals, continuously as a change is detected, or as the UE is released.

9. The method according to claim 1, further comprising appending the UE connection profile or an indicator of the UE connection profile to at least one container in at least one message to be transmitted to the network.

10. The method of claim 9, where the at least one container is assistance data for paging.

11. The method of claim 9, where the at least one container is a UE Radio Access Capability container.

12. A circuit arrangement for use by a communication network during connection of a user equipment to the communication network, the circuit arrangement comprising:
   a determination circuit for determining whether there is a connection profile available for the UE, and, responsive to determining that there is a connection profile available for the UE, fetching the UE connection profile through a fetching circuit, and a configuration circuit for configuring the connection with the UE according to the UE connection profile;
a monitoring circuit for monitoring traffic characteristics of the UE during the connection; and
a storing circuit for updating the connection profile based upon the traffic characteristics and storing the updated UE connection profile, when needed.

* * * * *